Feb. 28, 1950 B. E. AHLPORT 2,498,631
BACKFLOW PREVENTION VALVE
Filed Oct. 9, 1945 3 Sheets-Sheet 1
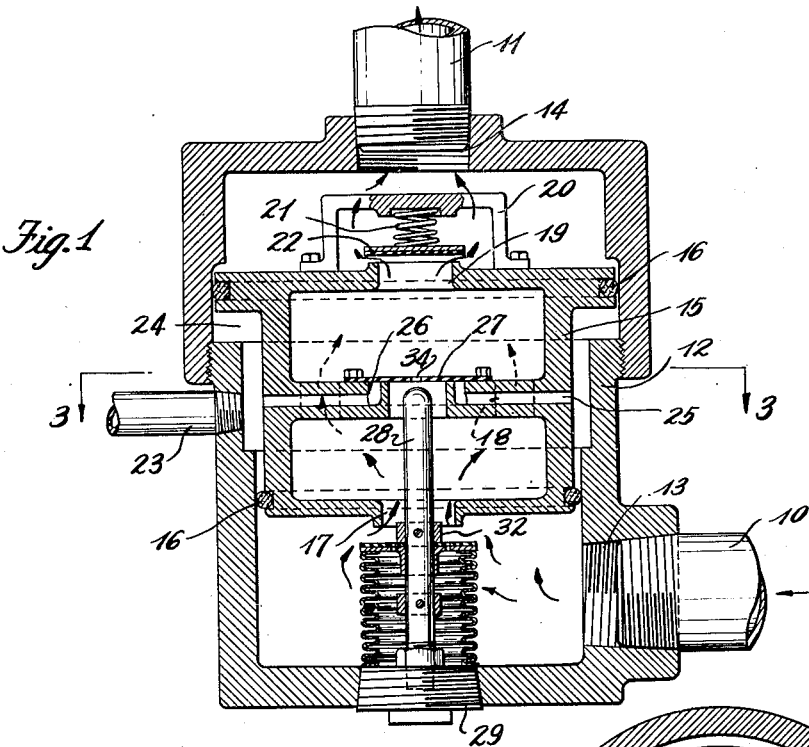
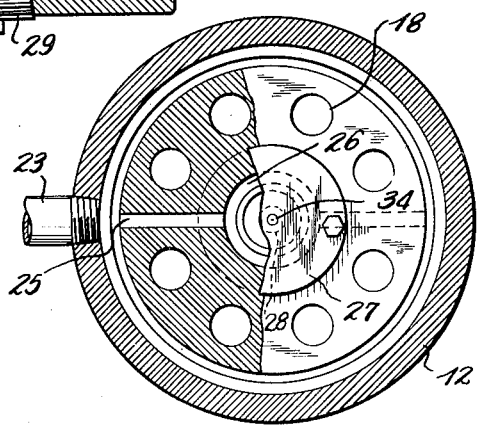
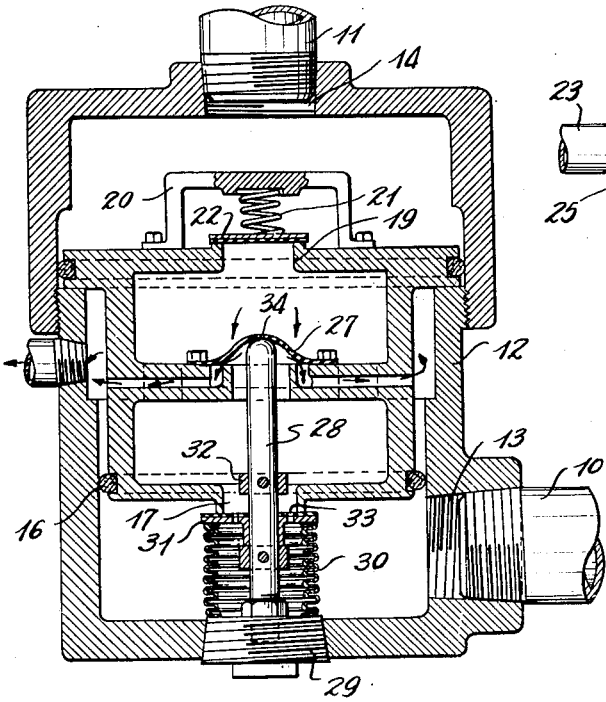
INVENTOR.
BRODIE E. AHLPORT
BY Hazard & Miller
Attorneys Feb. 28, 1950 — B. E. AHLPORT — 2,498,631
BACKFLOW PREVENTION VALVE
Filed Oct. 9, 1945 — 3 Sheets-Sheet 2

INVENTOR.
BRODIE E. AHLPORT
BY Hazard & Miller
Attorneys

Feb. 28, 1950  B. E. AHLPORT  2,498,631
BACKFLOW PREVENTION VALVE
Filed Oct. 9, 1945  3 Sheets-Sheet 3

INVENTOR.
BRODIE E. AHLPORT
BY
Hazard & Miller
Attorneys

Patented Feb. 28, 1950

2,498,631

UNITED STATES PATENT OFFICE 2,498,631

BACKFLOW PREVENTION VALVE

Brodie E. Ahlport, Los Angeles, Calif.

Application October 9, 1945, Serial No. 621,228

18 Claims. (Cl. 137—144)

This invention relates to improvements in valves designed to prevent backflow from a service line to a water main or the like.

A principal object of the invention is to provide a valve that is adapted to be interposed between the source of water supply such as a water main and a branch pipe therefrom or service line leading to a residence or factory which will prevent reverse flow from the service line to the water main and possible contamination of water in the main by the water returning through the service line. In many situations pressures in the service line and water main fluctuate greatly so that pressure in the water main may fall below the pressure in the service line or conversely pressure in the service line exceed pressure in the water main. If an ordinary check valve is interposed between the main and the service line, this check valve may not have occasion to seat under normal conditions for a long period of time, and may become corroded. The seat for the check valve may also corrode or have sediment deposited thereon so that when it is required to function due to the reverse pressure differential between the service line and the water main it will leak water from the service line into the water main with possible contamination.

The valve embodying the present invention contemplates the use of two valves, one of which functions as a check valve preventing reverse flow from the service line to the water main, and the other of which, when closed, prevents flow from the water main towards the service line. These valves are spaced from each other, and provision is made for draining the intervening space to the exterior of the valve housing so that under reverse flow conditions even if the check valve should leak the leakage is conducted off to the exterior of the housing and is prevented from entering and contaminating the water in the water main.

Valves of this general character have been devised heretofore but have been subject to the criticism in that when the pressures in the service line and water main are such that reverse flow is about to take place "wire drawing" of the valves may occur and the valves may assume equilibrium conditions wherein they both are partially closed and partially open without any adequate force or pressure effective thereon to urge them towards their seats or to open the drain valve. An important object of the present invention is to provide an improved valve of this general character which, when reverse flow commences, will have a cage in the housing that is urged by outlet pressure toward the inlet but which when it is moved toward the inlet has a part of those areas which are subjected to inlet pressure effectively "blanked off." When these areas are "blanked off" and rendered ineffective to inlet pressure it is apparent that once that reverse flow has started the outlet pressure will be more effective on the cage to move it toward the inlet than the inlet pressure will be to urge it toward the outlet. In this way, a type of snap action may be secured in the valve to more positively urge the valve of the cage to close when reverse flow starts and to more positively open the drain valve when the cage has been moved.

Another object of the invention is to provide a valve of this character wherein the cage or valve carrier is movably mounted in the line of flow with heads or diaphragms of any desired relative areas exposed respectively to inlet and outlet pressures. By varying the relative areas that are exposed to the inlet and outlet pressures as well as the area that is "blanked off," when the inlet valve is closed a wide variety of predetermined operating characteristics is obtainable. Thus with appropriate sizes of these areas it is not only possible to have the valve sensitive to very small pressure differentials but at the same time to have the force holding the inlet valve closed of a very high magnitude. Consequently the valve can be arranged to operate on almost any desired combination of differences in pressure including a pressure drop across the valve.

With the foregoing and other objects in view, which will be made manifest in the following detailed description and specifically pointed out in the appended claims, reference is had to the accompanying drawings for an illustrative embodiment of the invention, wherein:

Figure 1 is a sectional view through what may be regarded as a simplified form of valve embodying the present invention, the valve being shown in its normal position wherein flow is permitted to take place from the inlet to the outlet;

Fig. 2 is a view similar to Fig. 1, but illustrating the valve as having been shifted into that position wherein reverse flow from the service line is prevented and the drain valve is open to conduct off any back flow that may be released by a leaky check valve;

Fig. 3 is a horizontal section taken substantially upon the line 3—3 upon Fig. 1;

Figure 4:
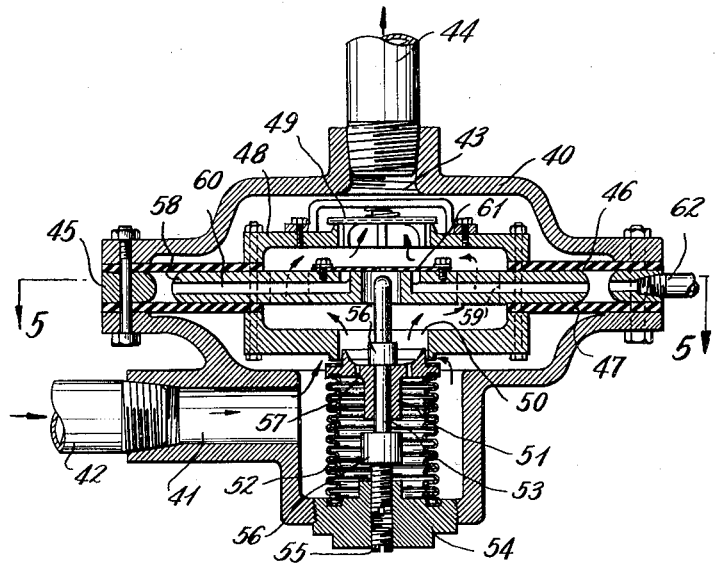
Fig. 4 is a sectional view through another form of valve embodying the present invention.
Figure 5:
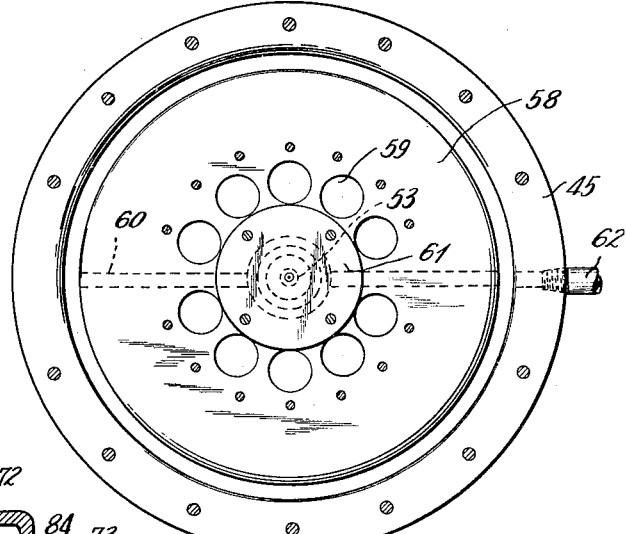
Fig. 5 is a horizontal section taken substantially upon the line 5—5 upon Fig. 4.

Referring to the accompanying drawings wherein similar reference characters designate similar parts throughout, and referring specifically to Figs. 1 to 3, inclusive, 10 indicates a source of supply, such as for example a connection to a water main. 11 indicates a branch pipe or service line that may lead from the water main or source of supply to a residence, factory, or the like. The valve embodying the present invention comprises a suitable housing 12 having an inlet 13 to which the supply line 10 is connected and an outlet 14 to which the service line 11 is connected. Within the housing there is movably mounted a passaged cage or carrier 15 which is shown in the form illustrated in Figs. 1, 2, and 3 as having a top surface of larger area than the bottom surface thereof so that there will be a greater area exposed to pressure in the outlet 14 than there is exposed to the pressure in the inlet 13. While the cage or carrier illustrated in these figures is shown as having these differing areas it is possible for the cage or carrier to have the same area on top and bottom and still gain advantages to which the present invention is directed. The cage or carrier is preferably equipped with suitable sealing rings 16 which have a slidable or wiping contact with cylindrical surfaces formed on the interior of the housing. The passage through the cage extends from an inlet 17 around which is formed a valve seat upwardly through apertures 18 in a central partition and finally through an outlet 19 around which is disposed a valve seat. On top of the carrier there is mounted a spring seat 20 for a compression spring 21 that urges a check valve 22 downwardly against the valve seat on top of the cage. This check valve permits flow through the cage from inlet 13 to outlet 14 but is intended to prevent flow in the reverse direction.

In the side of the housing there is provided a drain outlet 23 that communicates with the annular space 24 in the housing around the cage between the seals 16. Drain outlets 25 are formed in the central partition of the cage between the apertures 18. These communicate with an entrance that is common to all outlets formed by an annular groove 26 that is normally closed by a valve 27. This valve may be in the form of a spring-actuated disc or flapper type valve but is illustrated as being in the form of a rubber or rubber-like diaphragm. This diaphragm in its normal position overlies the entrance 26 to the drain outlets 25 and serves to close it. However, if the cage 15 descends into the position shown in Fig. 2, so that the diaphragm or valve 27 engages a stem 28 so as to be lifted thereby the entrance 26 to the outlet passages 25 may be opened to drain the interior of the cage 15 to the drain outlet 23. The stem 28 is stationarily mounted on the interior of the housing such as by plug 29 and surrounding the base of this stem there is a metallic bellows 30 carrying a valve closure 31 that is adapted to be engaged by and seat on the seat on the bottom of the cage which surrounds the inlet 17. A pair of collars 32 may be mounted on the stem 28 so as to provide shoulders engageable by the valve closure 31 so as to limit movements of the valve closure relatively to the stem and thus prevent rupture of the bellows 30 under extreme conditions. The interior of the bellows 31 is in constant communication with the interior of the cage or carrier 15 even when the closure 31 is seated, this being provided by aperture 33. If desired, these apertures may be omitted. A clearance between the center portion of the closure 31 and the stem 28 may be employed for this purpose. I have illustrated an aperture 34 in the center of the diaphragm 27. This aperture while not absolutely essential, is preferably employed so as to permit of flow through the diaphragm when the diaphragm or valve 27 is in closed position so that incoming surges in the cage will not tend to cause the diaphragm or valve 27 to temporarily open or flutter.

The operation and advantages of the above-described construction are as follows: Under normal conditions the valve will occupy the position shown in Fig. 1, wherein water from the main 10 will enter through the inlet 13, the inlet 17, and flow upwardly through the apertures 18 seating the check valve 22 and finally passing into the outlet 14. Assume, however, that pressure in the outlet 14 is nearly equal the pressure in the inlet 13 so that reverse flow from outlet 14 is about to start or may have started. Under these circumstances, inasmuch as the cage or carrier 15 presents a greater area exposed to outlet pressure than the bottom of the cage which is exposed to inlet pressure, the cage will be forced downwardly toward the inlet. As the cage moves downwardly the seat surrounding inlet 17 will engage the valve closure 31 and approximately at the same time, the valve or diaphragm 27 will engage the stem 28, so as to open the interior of the cage 15 to the outlet 23. Water that is entrapped between valves 22 and 31 may thus drain through the drain outlet 23 to a point externally of the housing. In the event that the check valve 22 should leak for any reason, any leakage past the check valve to the interior of the cage 15 will drain through the drain outlet 23 and will not be returned to the main 10. Inasmuch as the interior of the bellows 30 is in communication with the interior of the cage 15 and this cage is open to the drain outlet 23 at a reduced pressure which may be atmospheric the area on the underside of the valve closure 31 is effectively "blanked off" or in other words, is rendered non-effective to inlet pressure. Consequently, whenever the cage 15 has descended sufficiently to engage the closure 31 and to open the entrances 26 of the drain passages 25 the only force urging the cage 15 upwardly within the housing is the bottom surface of the cage 15 minus the area covered by a valve closure 31 and multiplied by the inlet pressure. The force urging the cage 15 downwardly is, of course, the outlet pressure multiplied by the total area on top of the cage. Because of this inequality in areas which will exist even though the cage 15 is of uniform diameter from top to bottom there will be a net effective force that urges the cage downwardly with considerable effort. Consequently, the improved valve is highly advantageous in that it is positive in its action and may be compared to a snap action bringing about a positive and definite closing of the inlet 17 and an opening of the drain passages 25 without flutter or "wire drawing." When normal conditions are resumed the cage 15 will not return to the position shown in Fig. 1 until the pressure in the inlet 13 has reached such a magnitude as to compensate for the "blanked off" area on the bottom of the cage 15 as opposed to the larger area on top of the cage which is subject to outlet pressure.

When an adequate differential between inlet and outlet pressures occurs or is created either by increasing the inlet pressure or decreasing outlet pressure and this differential is sufficient to overcome the effect of the ineffective "blanked off" area on the inlet side of the cage, the cage will be lifted and returned to its normal position.

In Fig. 4, an alternative form of construction is disclosed wherein there is a housing 40 having an inlet 41 adapted to be connected to a water main or source of supply indicated at 42, and an outlet 43 adapted to be connected to a service line 44. The housing is in the form of two opposed parts having companion flanges adapted to be fastened together on opposite sides of a spacing ring 45 and on opposite sides of this spacing ring there are flexible diaphragms 46 and 47. These diaphragms serve to movably support a cage or carrier 48 within the housing. This cage or carrier has an outlet adapted to be closed by a check valve 49 and has an inlet 50 adapted to be closed by an inlet valve 51 which is mounted on a corrugated bellows 52. The bellows 52 and the stem 53 may be mounted on a plug 54. The stem is preferably threaded into the plug and on removal of a screw 55 the stem may be adjusted. The valve 51 is slidable on the stem between limits provided by collars or shoulders 56 and apertures 57 may be formed in the valve to place the interior of the bellows in communication with the interior of the cage or carrier when the valve 51 is in inlet-closing position. In the carrier 48 between the diaphragms 46 and 47 there is a partition 58 having apertures 59 therethrough to permit of passage of water from the inlet to the outlet. In the partition 58 there are drain passages 60 the entrance to which is normally closed by a valve 61 in the form of a rubber diaphragm that may have an aperture therein and which is engageable with the top of stem 53 when the carrier or cage descends toward the inlet. The drain passages 60 are in communication with a drain pipe 62 that is connected to the spacer ring 45.

The operation of this form of construction is substantially as follows: In the normal position of the valve water entering the inlet 41 passes by the open inlet valve 51 into the interior of the cage or carrier 48 and flows upwardly through apertures 59 through the outlet from the cage past the check valve 49 to the outlet 43. If reverse flow starts to take place from outlet 43 toward inlet 41 check valve 49 closes so that the pressure of the reverse flow is effective on the top of the cage or carrier 48 and on diaphragm 46 to move the cage or carrier downwardly or toward the inlet. During such downward movement valve 51 will be engaged to close the inlet to the cage or carrier and the valve 61 which controls the drain passages 60 will engage the stem 53 and be opened thereby. The drain passages 60 being thus opened, in the event that leakage takes place past the check valve 49 the leakage will be conducted externally of the housing and will not be returned to the water main or source of supply indicated at 42 to contaminate the water therein.

Not only will leakage past the check valve 49 be conducted externally of the housing but any leakage into the cage or carrier will be conducted off. In the construction as previously explained, when valve 51 is seated the bellows on the back of the valve prevents inlet pressure from being effective on the underside of valve 51 in opposition to outlet pressure that is effective on the top of check valve 49. Consequently, the seating or closing of the inlet valve 51 in effect blanks off or renders ineffective a certain area on the underside of the cage or carrier 48 so that this area will not be subjected to inlet pressure. Consequently, the closing of valve 51 brings about a pronounced differential in pressure effective on the cage or carrier that favors the outlet pressure. For this reason whenever the outlet pressure but barely exceeds the inlet pressure the valve is very positive in its action to firmly close the inlet valve and to positively open the drain passages.

Figure 6:
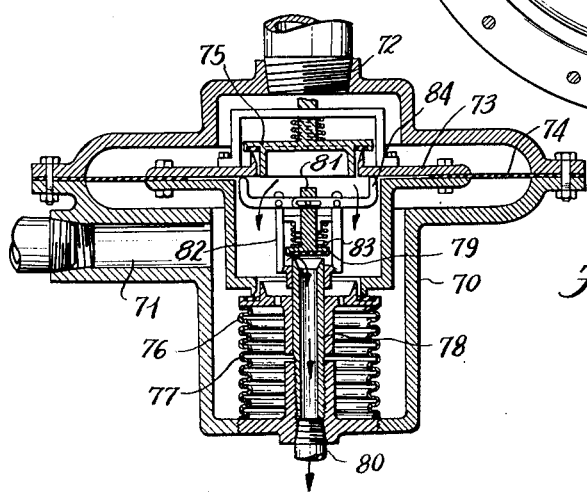
Fig. 6 is a vertical section through still another form of valve embodying the present invention.

In Fig. 6, an alternative form of construction is disclosed wherein there is a housing 70 having an inlet 71 adapted to be connected to a source of supply and an outlet 72 adapted to be connected to a service line. In this form of construction, the cage or carrier 73 is movably supported within the housing by a single flexible diaphragm 74. The cage or carrier has an outlet controlled by a check valve 75 and an inlet adapted to be closed by an inlet valve 76 supported on a corrugated bellows 77. The inlet valve 76 is slidably mounted between limits on a hollow stem 78 which not only functions as a stem to unseat a drain valve 79 when the cage or carrier descends, but also provides a drain passage leading from the interior of the cage or carrier to a drain pipe 80. The drain valve is suitably mounted on the interior of the cage or carrier and is spring-actuated so as to be normally urged downwardly into seating position on top of the hollow stem 78. It has a stem 81 slidably extending through a valve guide 82 and its spring 83 is in the form of a compression spring that urges the valve downwardly with relation to the guide which is stationarily mounted on the stem 78. A pair of angular levers 84 are pivotally mounted on the valve guide 82 and are connected by pin and slot connections with the stem 81. The outer ends of these levers are engageable with the underside of the top of the cage or carrier so that when the cage or carrier descends the angular levers will be caused to turn on their pivots to lift and open the drain valve 79.

The operation of this form of construction is substantially the same as that previously described in that during normal operation flow takes place from inlet 71 to outlet 72 through the cage or carrier. In the event of reverse flow the check valve 75 seats and the cage or carrier is caused to move downwardly within the housing. During the downward movement the inlet in the bottom of the cage or carrier engages the inlet valve 76 and is closed thereby. Downward movement of the cage or carrier relatively to the stem 78 causes the drain valve 79 to open and drain the contents of the cage or carrier and any leakage past the check valve 75 to a point external of the housing. In this form of construction the bellows 77 on the underside of the inlet valve 76 in effect blanks off a portion of the area on the underside of the carrier rendering it uninfluenced by inlet pressure when the inlet to the cage is closed. Thus a magnified differential in pressure is created favoring the outlet pressure on the closure of the inlet valve thus making the construction operate positively and with snap action avoiding fluttering and wire drawing.

Figures 7, 8:
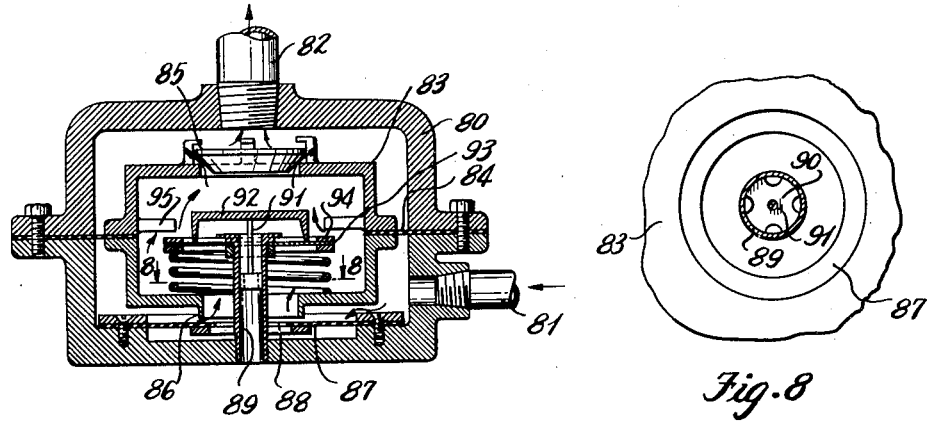
Fig. 7 is a sectional view through another form of valve embodying the present invention.
Fig. 8 is a horizontal section taken substantially upon the line 8—8 upon Fig. 7.

In Fig. 7, still another form of construction is disclosed wherein the housing 80 has an inlet 81 and an outlet 82. The cage or carrier 83 is supported for movement therein by means of a flexible diaphragm 84. In this construction the check valve 85 is adapted to seat in the top of the carrier and the inlet valve is provided by forming an extension or seat 86 on the bottom of the carrier that is engageable with a flexible diaphragm 87 supported near the bottom of the housing and having an aperture 88 surrounding the drain conduit 89. In the drain conduit there is disposed a spider 90, see Fig. 8, having a stem 91 that supports the drain valve closure 92. On the conduit 89 there is supported a flexible diaphragm 93 engageable with the seating surface of the closure 92. The edges of this diaphragm may be suitably stiffened by rings 94, the upper of which is engageable by fingers 95 extending inwardly from the walls of the cage or carrier 83. In this form of construction the cage or carrier is normally spaced above the diaphragm 87 so that flow from the inlet 81 may enter the cage or carrier between its bottom and the lower diaphragm and flow upwardly past the check valve 85 to outlet 82. On reverse flow the check valve 85 seats and the carrier moves downwardly so that the extension 86 engages the diaphragm 87 thus forming a closure for the inlet. During the downward movement the fingers 95 engage and depress the diaphragm 93 causing this diaphragm to disengage the drain valve closure 92 and permit egress from the interior of the cage to the drain conduit 89. In this form of construction the area within the extension 86 is rendered ineffective to inlet pressure when the carrier seats on the diaphragm 87 thus creating a pressure differential in favor of the outlet pressure when the inlet valve is closed.

Figure 9:
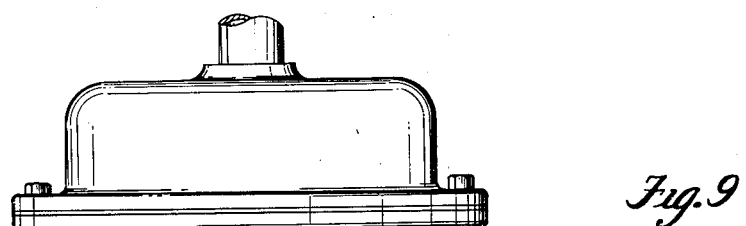
Fig. 9 is a view in side elevation, parts being broken away and shown in vertical section illustrating a modification of the valve shown in Fig. 7.

The construction shown in Fig. 9 is the same as that illustrated in Fig. 7 with the exception that the extension 86a is engageable directly with the resilient seat 87a that may be mounted on the bottom of the housing 80a.

Figure 10:
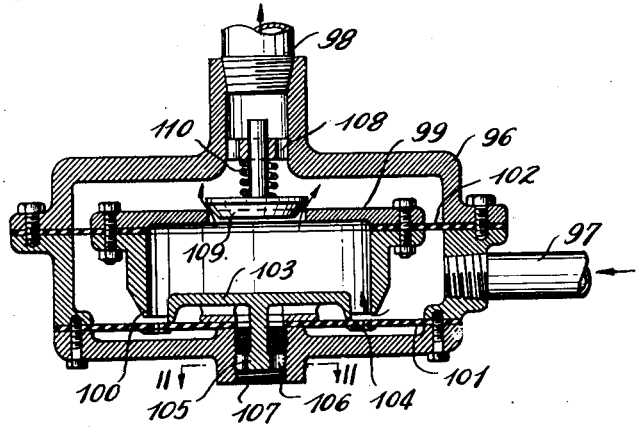
Fig. 10 is a vertical section through still another form of valve embodying the present invention.
Figure 11:
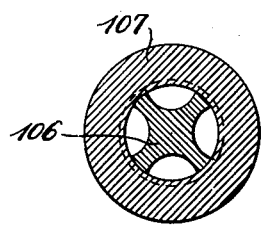
Fig. 11 is a horizontal section taken substantially upon the line 11—11 upon Fig. 10.

In the construction shown in Fig. 10 the valve comprises a housing 96 having an inlet 97 and an outlet 98. This form of construction illustrates the cage or carrier 99 as having a fully open bottom and a seating surface 100 engageable with a diaphragm 101. The diaphragm is sealed at its inner and outer peripheries to the interior of the housing. The carrier is mounted for movement within the housing by a flexible diaphragm 102. Within the cage or carrier there is a drain valve closure 103 that is also engageable with the diaphragm 101 and this diaphragm is perforated as at 104 between its seating surfaces with the drain valve closure 103 and with the seating surface 100. The drain valve closure is mounted on a stem 105 which in turn is mounted on a spider 106 in the drain outlet 107. In this form of construction flow takes place from the inlet to the outlet as indicated by the arrows but on reversed flow the downward movement of the carrier seats on the diaphragm 101 thus closing off the interior of the cage or carrier from the inlet. At the same time diaphragm 101 is caused to disengage the drain valve closure 103 and thus open the interior of the cage to the drain outlet 107. Any pressure beneath the diaphragm 101 may readily escape through the perforations 104 to the drain outlet.

In the form illustrated in Fig. 10 I have shown the outlet as having a spider or valve guide 108 therein and the check valve 109 for the top of the cage or carrier has a stem slidable through this spider. It is urged downwardly into closing position against the seat in the top of the cage or carrier by a compression spring 110. In the forms previously illustrated the check valve that prevents reverse flow from the outlet has been illustrated as being mounted entirely on the cage or carrier. This mounting of the check valve is not essential as is illustrated in this figure inasmuch as the construction will operate in the same manner regardless of whether the check valve is mounted on the cage itself or otherwise mounted for engagement with the seat on the cage. In each of the forms previously illustrated the check valve at the top of the carrier may be mounted in a manner similar to that illustrated in Fig. 10 if so desired.

In all of the above constructions the valve may be designed to operate on any desired or preferred pressure differential conditions. Thus, by varying the relative sizes of the diaphragms and carrier areas exposed to outlet pressures and the area of the inlet valve or that area that is blanked off from inlet pressure, when the carrier moves downwardly the valve may be caused to function on any differential in pressure between the inlet and outlet. When the inlet valve has once closed and area on the inlet side of the cage or carrier is thus blanked off, the resultant forces acting on the carrier favor the outlet pressure. On opening the drain passage any leakage is drained off and an air gap introduced into the line of flow between the inlet and outlet so that the device also acts as a vacuum breaker. The slack or free play between the inlet valve and the cage or carrier permits of slight ebbs and flows of fluid without necessarily setting the valve.

In Figs. 1, 2, 4, and 6, the diameter of the bellows beneath the valve that controls the inlet to the carrier or cage is illustrated as being either equal to or greater than the diameter of the seating surface surrounding the inlet. In all instances the valve that controls the inlet must, of course, be large enough to seat on the seating surface and to close the inlet but it does not follow that the diameter of the bellows must be as large as the diameter of the inlet valve. The bellows may be materially smaller in diameter than the inlet valve and may be materially smaller in diameter than the diameter of the seating surface. The relationship between the diameter of the bellows and the diameter of the seating surface surrounding the inlet to the cage or carrier affects the operation to a considerable extent. Thus, if the bellows has a diameter considerably smaller than the seating surface surrounding the inlet there is an exposed area on the underside of the inlet valve that is subject to inlet pressure tending to cause the inlet valve to remain closed even after the cage or carrier starts to rise in resuming normal conditions. This is effective to cause the inlet valve to follow the carrier upwardly and thus prevent leakage into the carrier until after the drain valve has been fully closed. By making the bellows the same diameter as the seating surface this following tendency of the inlet valve is eliminated and if the bellows is made larger than the seating surface surrounding the inlet the effect of the inlet pressure on the inlet valve is in the reverse direction during upward movements of the cage or carrier. The sensitivity of the device can thus be varied or controlled to meet various conditions by changing the relationship of the size of the bellows with respect to the seating surface surrounding the inlet to the cage or carrier.

Various changes may be made in the details of construction without departing from the spirit and scope of the invention as defined by the appended claims.

I claim:

1. A valve of the class described comprising a housing having an inlet and an outlet, means movable in the housing between the inlet and outlet subjected to the pressures therein so as to be movable thereby, said means providing for flow therethrough from the inlet to the outlet, check valve means on the movable means for preventing reverse flow therethrough from the outlet, means for closing said means against flow therethrough from the inlet when said means is moved by outlet pressure toward the inlet, and means for opening the interior of said means to the exterior of the housing when said means is moved toward the inlet.

2. A valve of the class described comprising a housing having an inlet and an outlet, a passaged means movably supported within the housing subject to the outlet and inlet pressures so as to be movable thereby within the housing, check valve means on the passaged means preventing reverse flow from the outlet therethrough, valve means engageable by said means when it is urged by outlet pressure toward the inlet to close said passaged means against flow therethrough from the inlet, and means operable by movement of said passaged means toward the inlet for opening the interior of the passaged means to the exterior of the housing.

3. A valve of the class described comprising a housing having an inlet and an outlet, means movably mounted in the housing, subjected to inlet and outlet pressures so as to be moved thereby, said means serving to conduct flow from the inlet to the outlet, valve means on said movably mounted means for preventing reverse flow therethrough from the outlet, means for causing the outlet pressure to be more effective on said means than the inlet pressure when said means is moved toward the inlet by the outlet pressure, and means operable by movement of said means toward the inlet for closing said means against flow from the inlet and opening said means to the exterior of the housing.

4. A valve of the class described comprising a housing having an inlet and an outlet, means movably mounted in the housing subjected to inlet and outlet pressure so as to be moved thereby, said means providing for flow therethrough from the inlet to the outlet valve means on said movably mounted means for preventing reverse flow therethrough from the outlet, means for blanking off a portion of the area on said means when said means is moved by outlet pressure toward the inlet so that the inlet pressure will then be less effective on said means to urge it toward the outlet, and means operable by movement of said means toward the inlet for opening said means to the exterior of the housing.

5. A valve of the class described comprising a housing having an inlet and an outlet, means movably mounted in the housing subjected to inlet and outlet pressure so as to be moved thereby, said means providing for flow therethrough from the inlet to the outlet a valve on said means for preventing reverse flow therethrough from the outlet, a valve engageable by said means when it is moved toward the inlet to close said means against flow therethrough from the inlet, said valve being so arranged as to render inlet pressure less effective on the back thereof when engaged by said means so that when the valve is engaged inlet pressure will be less effective on said means to urge it toward the outlet, and means operable by movement of said means for opening the interior of said means to the exterior of the housing.

6. A valve of the class described comprising a housing having an inlet and an outlet, means movably mounted in the housing subjected to inlet and outlet pressure so as to be moved thereby, valve means on said movably mounted means for preventing reverse flow therethrough from the outlet, a valve engageable by said means when it is moved toward the inlet to close said means against flow therethrough from the inlet, a corrugated bellows on the back of said valve for rendering inlet pressure less effective on the back thereof when engaged by said means so that when the valve is engaged inlet pressure will be less effective to urge said means toward the outlet, and means operable by movement of said means for opening the interior of said means to the exterior of the housing.

7. A valve of the class described comprising a housing having an inlet and an outlet, a cage having a passage therethrough, movably mounted in the housing but sealed therewith against flow except through the passage through the cage, a valve adapted to seat on the cage permitting flow therethrough to the outlet but preventing flow in the reverse direction, a valve engageable by the cage when the cage is moved by outlet pressure toward the inlet, and means operable by movement of the cage toward the inlet for opening the cage between the valves to the exterior of the housing.

8. A valve of the class described comprising a housing having an inlet and an outlet, a cage having a passage therethrough movably mounted in the housing but sealed therewith against flow except through the passage through the cage, a valve adapted to seat on the cage permitting flow therethrough to the outlet but preventing flow in the reverse direction, a valve engageable by the cage when the cage is moved by outlet pressure toward the inlet, a bellows mounted on the interior of the housing and on which the last-mentioned valve is mounted, the interior of the bellows being in communication with the interior of the cage when its valve is engaged by the cage, and means operable by movement of the cage toward the inlet for opening the interior of the cage to the exterior of the housing.

9. A valve of the class described comprising a housing having an inlet and an outlet, a cage having a passage therethrough movably mounted in the housing but sealed therewith against flow except through the passage through the cage, a valve adapted to seat on the cage permitting flow therethrough to the outlet but preventing flow in the reverse direction, a valve engageable by the cage when the cage is moved by outlet pressure toward the inlet, a drain valve on the cage for controlling communication of the interior of the cage with the exterior of the housing, and a stem on the housing arranged to open said drain valve when said cage is moved toward the inlet.

10. A valve of the class described comprising a housing, an inlet and an outlet therefor, a cage sealed with the interior of the housing but movably mounted therein for movement under the influence of inlet and outlet pressures, said cage having a passage therethrough, a check valve for said passage for preventing reverse flow through the cage from the outlet, a drain valve for controlling communication between the passage of the cage and the exterior of the housing, means for controlling flow from the inlet to the cage and rendering inlet pressures less effective on the cage when the cage is moved toward the inlet by outlet pressure, and means for opening the drain valve when the cage is moved toward the inlet.

11. A valve of the class described comprising a housing having an inlet and an outlet, a cage sealed with the interior of the housing but movably mounted therein for movement under the influence of inlet and outlet pressures, said cage having a passage therethrough, a check valve for said passage for preventing reverse flow through the cage from the outlet, a drain valve for controlling communication between the interior of the cage and the exterior of the housing, a hollow stem on which the drain valve is adapted to seat, means for controlling flow from the inlet to the cage and rendering inlet pressure less effective on the cage when the cage is moved toward the inlet by outlet pressure, and means operable by movement of the cage relatively to said hollow stem for opening said drain valve.

12. A valve of the class described comprising a housing having an inlet and an outlet, a cage sealed with the interior of the housing but movably mounted therein for movement under the influence of inlet and outlet pressures, said cage having a passage therethrough, a check valve for said passage for preventing reverse flow through the cage from the outlet, a drain passage leading from the interior of the cage to the exterior of the housing, a drain valve for controlling communication between the interior of the cage and the exterior of the housing, means providing a seat on the interior of the housing engageable by a seating surface on the cage to close the cage against flow thereto from the inlet, and means operable by the movement of the cage under the influence of outlet pressure for opening the drain valve.

13. A valve of the class described comprising a housing having an inlet and an outlet, a cage sealed with the interior of the housing but movably mounted therein for movement under the influence of inlet and outlet pressures, said cage having a passage therethrough, a check valve in said passage for preventing reverse flow through the cage from the outlet, a drain passage leading to the exterior of the housing, a drain valve for controlling communication between the interior of the cage and said drain passage, a flexible diaphragm in the housing engageable by the cage when the cage is moved under the influence of outlet pressure and means operable by the seating of the cage on said flexible diaphragm for opening the drain valve.

14. A valve of the class described comprising a housing having an inlet and an outlet, means movably mounted in the housing for conducting flow between the inlet and the outlet and subjected to inlet and outlet pressures so as to be movable thereby, means on the movably mounted means for preventing reverse flow therethrough from the outlet, means for closing said means against flow therethrough from the inlet when said means has been moved toward the inlet by outlet pressure, and means for opening said means to the exterior of the housing when said means has been closed against flow therethrough from the inlet.

15. A valve of the class described comprising a housing having an inlet and an outlet, means movably mounted in the housing for conducting flow between the inlet and the outlet and subjected to inlet and outlet pressures so as to be movable thereby, means on said movably mounted means for preventing reverse flow therethrough from the outlet, means for closing said means against flow therethrough from the inlet when said means has been moved toward the inlet by outlet pressure, and means for opening said means to the exterior of the housing when said means has been closed against flow therethrough from the inlet, said means presenting unequal areas subject to outlet and inlet pressures respectively.

16. A valve of the class described comprising a housing having an inlet and an outlet, means subject to inlet and outlet pressures movable in the housing and serving to conduct flow from the inlet to the outlet, means for closing said means against ingress thereto from the inlet and the outlet when the outlet pressure exceeds the inlet pressure by a predetermined amount and means for opening said means to the exterior of the housing when it has been closed against ingress.

17. A valve of the class described comprising a housing having an inlet and an outlet, means movably mounted in the housing having a passage therethrough for conducting fluid from the inlet to the outlet, said means being subject to inlet and outlet pressures so as to be urged to move in the housing thereby, a check valve for closing said passage against reverse flow therethrough from the outlet, means for closing said passage against flow therethrough from the inlet when said means is caused to move in a direction in opposition to inlet pressure, and means operable by such movement of said means for opening said passage to the exterior of the housing.

18. A valve of the class described comprising a housing having an inlet and an outlet, means movably mounted in the housing having a passage therethrough for conducting fluid from the inlet to the outlet, said means being subject to inlet and outlet pressures so as to be urged to move in the housing thereby, a check valve for closing said passage against reverse flow therethrough from the outlet, a closure means movably mounted within the housing and engageable by said means when it is moved by outlet pressure in a direction in opposition to inlet pressure to close said passage against flow therethrough from the inlet, and means for opening said passage to the exterior of the housing when said passage has been closed against flow therethrough from the inlet.

BRODIE E. AHLPORT.

REFERENCES CITED

The following references are of record in the file of this patent:

UNITED STATES PATENTS

| Number | Name | Date |
|---|---|---|
| 1,960,144 | Entriken | May 22, 1934 |
| 2,310,586 | Lohman | Feb. 9, 1943 |
| 2,328,118 | Ahlport | Aug. 31, 1943 |
| 2,389,413 | Carlton | Nov. 20, 1945 |